United States Patent
Chen et al.

(10) Patent No.: US 7,181,481 B2
(45) Date of Patent: Feb. 20, 2007

(54) SYSTEM AND METHOD FOR CONCURRENTLY REORGANIZING LOGICALLY RELATED LOB TABLE SPACES

(75) Inventors: Julie Chen, San Jose, CA (US); William James Franklin, San Ramon, CA (US); John Marland Garth, Gilroy, CA (US); Li-Mey Lee, Cupertino, CA (US); John Richard Lyle, Morgan Hill, CA (US); Frances Hwa Villafuerte, San Jose, CA (US); Jay A. Yothers, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 10/687,597

(22) Filed: Oct. 20, 2003

(65) Prior Publication Data

US 2005/0086269 A1   Apr. 21, 2005

(51) Int. Cl.
*G06F 17/30* (2006.01)
(52) U.S. Cl. .................. 707/205; 707/10; 707/200
(58) Field of Classification Search .................. 707/10, 707/200, 205
See application file for complete search history.

(56) References Cited

U.S. PATENT DOCUMENTS

| | | | |
|---|---|---|---|
| 5,842,208 A | 11/1998 | Blank et al. ................. 707/7 |
| 6,038,569 A | 3/2000 | Beavin et al. ............... 707/203 |
| 6,122,640 A * | 9/2000 | Pereira .................... 707/103 R |
| 6,163,783 A * | 12/2000 | Hintz et al. .................. 707/201 |
| 6,237,003 B1 | 5/2001 | Lewish et al. ............... 707/101 |
| 6,272,486 B1 | 8/2001 | Garth et al. .................... 707/2 |
| 6,457,014 B1 * | 9/2002 | Parker ........................ 707/102 |
| 6,460,048 B1 | 10/2002 | Teng et al. ............. 707/103 R |
| 6,606,617 B1 | 8/2003 | Bonner et al. .................. 707/2 |
| 6,738,790 B1 * | 5/2004 | Klein et al. .................. 707/203 |
| 2002/0065792 A1 | 5/2002 | Bonner et al. .................. 707/1 |
| 2002/0138497 A1 | 9/2002 | Chen et al. ............. 707/104.1 |
| 2003/0135478 A1 * | 7/2003 | Marshall et al. ............... 707/1 |

OTHER PUBLICATIONS

"A Novel Facility for Exploring the Contents of a Datasource," *IBM Technical Disclosure Bulletin*, v33, N7, Dec. 1990, pp. 177-80.
"Spanning Temporary Reorg Files," *IBM Technical Disclosure Bulletin*, v36, N6A, Jun. 1993, p. 159.

* cited by examiner

*Primary Examiner*—Tim Vo
*Assistant Examiner*—Hung Pham
(74) *Attorney, Agent, or Firm*—Randy W. Lacasse; Lacasse and Associates, LLC

(57) ABSTRACT

A base table and related auxiliary table spaces are reorganized concurrently via a database utility. The database utility determines which auxiliary tables are related to the base table and automatically includes their respective auxiliary table in the same invocation of the utility. The reorganization is performed via allocated shadow data sets. The original data sets are switched with the newly built shadow data sets including the LOB shadows.

20 Claims, 3 Drawing Sheets

SYSTEM AND METHOD FOR CONCURRENTLY REORGANIZING LOGICALLY RELATED LOB TABLE SPACES

BACKGROUND OF THE INVENTION

1. Field of Invention

The present invention relates generally to the field of database systems. More specifically, the present invention is related to the reorganization of logically related LOB table spaces.

2. Discussion of Prior Art

A database consists of sets (or tables) of records (or rows) consisting of individual data fields (or columns). LOBs (large objects) are one class of data types that are stored in a database. There are three types of LOBs: (a) character large objects —CLOBs; binary large objects —BLOBs; and double byte character large objects—DBCLOBs. LOB table spaces consist of a base table space and one or more auxiliary tables which each have their own table space. In current database systems, the base table space and the auxiliary table space are reorganized independently.

The following references provide a general teaching in the area of databases and reorganization, but they fail to provide for the limitations of the present invention's system and method.

The U.S. Pat. No. 5,842,208 to Blank et al. provides for a high performance recover/build index system based upon unloading databases files in parallel. The recover/build index system builds a database index for a database file by scanning partitions of the database file in parallel to retrieve key values and their associated record identifier (rid) values. The recover/build index system then sorts the scanned key/rid values for each partition in parallel. Next, the recover/build index system performs one or more merges on the sorted key/rid values from all of the partitions to generate a single key/rid value stream. Finally, the recover/build index system builds the index using the single key/rid value stream.

The U.S. Pat. No. 6,038,569 to Beavin et al. provides for a system for data structure loading with concurrent image data. After data records are obtained from one or more data sources, each of the data records is associated with one of multiple pages. As each page is completed, it is written to a primary data structure. Partially or completely failed primary data structures may also be restored using image copies made previously.

The U.S. Pat. No. 6,535,895 to Bonner et al. provides for a technique to avoid processing well clustered LOB's during reorganization of a LOB table space. A table space is reorganized in a database stored on a data storage device connected to a computer. When inserting or updating a LOB into a portion of the table space, a space map is marked to indicate whether the LOB was well inserted. When reorganizing the table space, when the space map indicates that a LOB was well inserted, reorganization of the portion of the table space in which the LOB was well inserted is avoided. U.S. Pat. No. 6,606,617 and U.S. patent publication No. 2002/0065792, both by Bonner et al., provide for a similar teaching.

The U.S. Pat. No. 6,237,003 to Lewish et al. provides for a method and apparatus for supporting dynamic run-time object definition in a relational database system. A mediating layer is introduce between the applications and the database objects.

The U.S. application publication to Chen et al. (2002/0138497) discloses the implementation of a database trigger that automatically executes a set of SQL statements whenever a specified event occurs. The trigger could be reading or updating a database or perform other functions. The database is programmed to allow a large object (LOB) data to be stored with transition variables. A base table appears to comprise a database having a row identifier ("row"ID) and one or more non-large object columns and large object and large object (LOB) tables. RowID and version are used to access the LOB data in an auxiliary table.

The IBM TDB (Vol. 33, No. 7, December 1990, pp 177–180) entitled "Browsing: A novel facility for exploring the contents of a datastore" discloses a method for navigating from a data element to related data elements, wherein the data elements may be related to other data elements of the same class (or another class) by named relationships.

Whatever the precise merits, features, and advantages of the above cited references, none of them achieves or fulfills the purposes of the present invention.

SUMMARY OF THE INVENTION

The present invention provides for a method for reorganizing a table space in a database. An exemplary embodiment comprises the steps of: (a) blocking write access to data being reorganized; (b) identifying LOB table spaces that are related to the table space being reorganized; (c) concurrently creating a shadow data set for each of the LOB table spaces and a shadow data set for the table space and associated indexes; (d) loading rows into shadow data sets, and for each row loaded, reading LOBs from each of LOB table spaces relating to a loaded row and writing the read LOB to a corresponding shadow data set; (e) switching original data set with shadow data sets; and (f) allowing write operations related to data being organized to proceed.

The present invention also provides for a system to reorganize a table space in a database. In an exemplary embodiment, the system comprises: (a) an identifier to identify LOB table spaces that are related to the table space being reorganized; (b) a shadow data set creator to concurrently create a shadow data set for each of the LOB table spaces and a shadow data set for the table space and associated indexes; (c) a shadow data set loader to load rows into shadow data sets, and for each row loaded, reading LOBs from each of the LOB table spaces relating to a loaded row and writing said read LOB to a corresponding shadow data set; and (d) a data switcher to switch the original data set with the shadow data sets.

Hence, the present invention's system and method reorganizes a table space (that contains a LOB base table) and related table spaces (which contain the LOB auxiliary tables). A major advantage of the present invention is that users of the REORG utility do not have to have knowledge of the related LOB table spaces. The LOB table space relationships are determined by the REORG utility. This allows for optimum performance because all of the table spaces, related to a LOB, would be reorganized at the same time. In addition, the LOB REORG would free unused space, as is done in a normal REORG, and the data would be loaded in the correct sequence.

DESCRIPTION OF THE PREFERRED EMBODIMENTS

Figure 1:
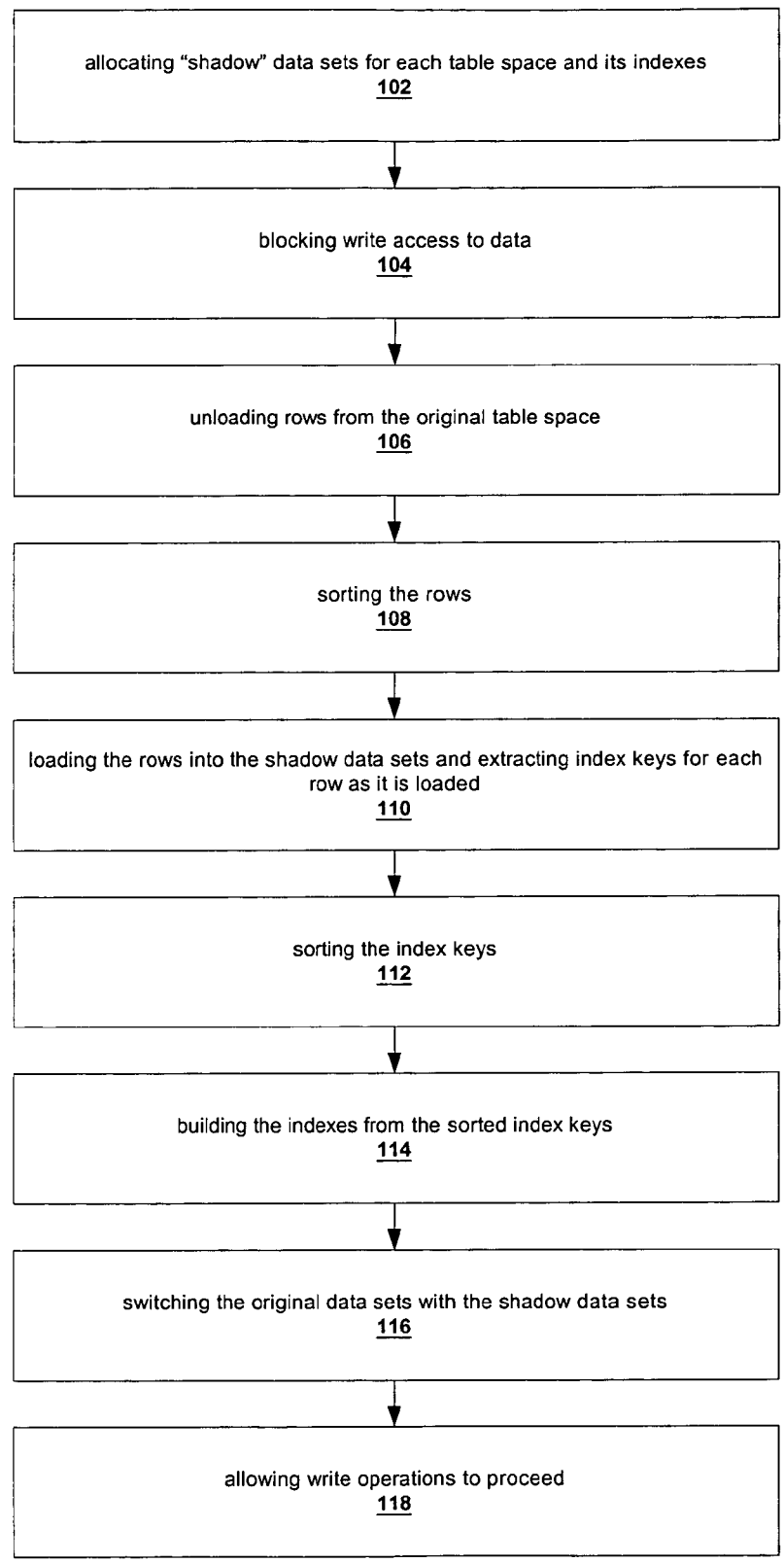
FIG. 1 illustrates the method associated with DB2's current REORG utility.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

The DB2 REORG utility reorganizes a table space to improve access performance and to reclaim fragmented space. FIG. 1 illustrates the method associated with DB2's current REORG utility. The current DB2 REORG SHR-LEVEL REFERENCE utility works by: (a) allocating "shadow" data sets for each table space and its indexes—step 102; (b) blocking write access to the data—step 104; (c) unloading rows from the original tables space—step 106; (d) sorting the rows—step 108; (e) loading the rows into the shadow data sets and extracting index keys for each row as it is loaded—step 110; (f) sorting the index keys—step 112; (g) building the indexes from the sorted index keys—step 114; (h) switching the original data sets with the shadow data sets—step 116; and (i) allowing write operations to proceed—step 118.

The present invention provides for a system and method for the simultaneous reorganization of a base table and any related auxiliary table spaces. The present invention determines which auxiliary tables are related to the base table and automatically includes their respective table spaces in the same invocation of the utility. This relieves a user from knowing the relationships between the base and auxiliary table spaces.

In the present invention, REORG determines which LOB table spaces are related to the table space being reorganized. It creates shadow data sets for each LOB table space at the same time it creates the shadow data sets for the table space and indexes. During the loading of rows into the shadow table space, for each row loaded, LOBs are read from each of the LOB table spaces related to the row being loaded, and written into the shadow data set for that LOB.

Figure 2:
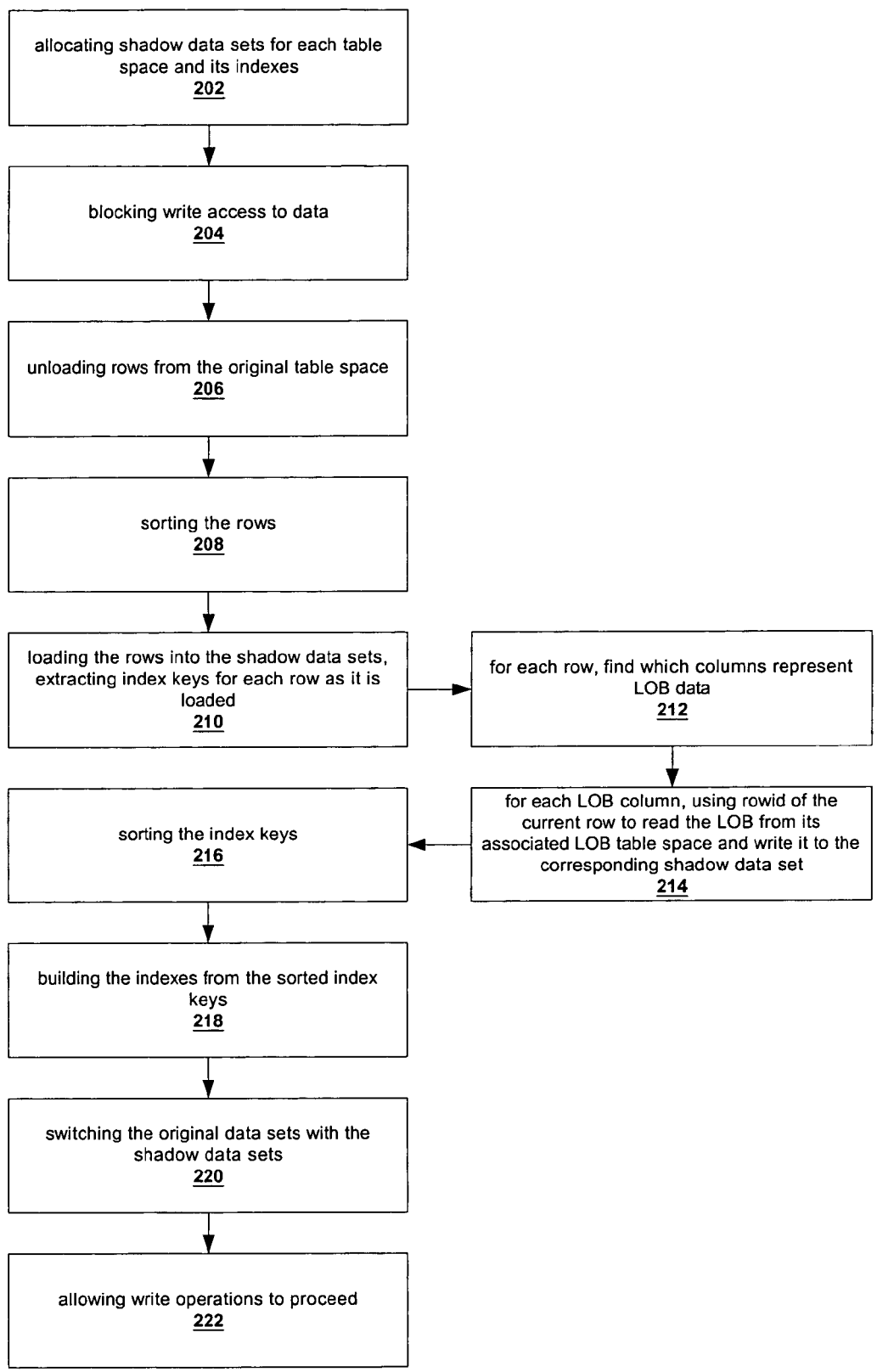
FIG. 2 illustrates a method associated with an exemplary embodiment of the present invention.

FIG. 2 illustrates a method associated with an exemplary embodiment of the present invention. The method of FIG. 2 comprises the steps of: (a) allocating "shadow" data sets for each of the table spaces and indexes—step 202; (b) blocking write access to the data—step 204; (c) unloading rows from the original table spaces—step 206; (d) sorting the rows—step 208; (e) loading the rows into the shadow data sets and extracting index keys for each row as it is loaded—step 210, and (i) for each row, identifying which columns represent LOB data—step 212; and (ii) for each LOB column, utilizing the rowid of the current row to read the LOB from its associated LOB table space and write the read LOB to the corresponding shadow data set—step 214;

(f) sorting the index keys—step 216; (g) building the indexes from the sorted index keys—step 218; (h) switching the original data sets with the shadow data sets (including LOB shadows)—step 220; and (i) allowing write operations to proceed—step 222.

Figure 3:
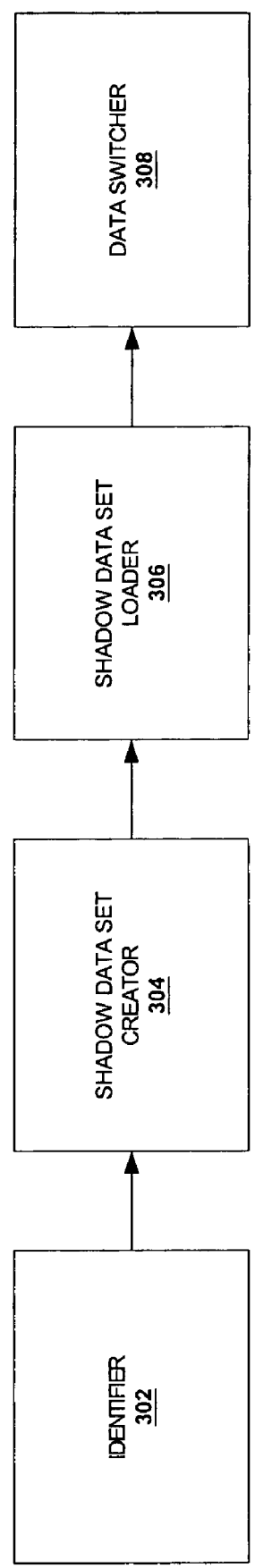
FIG. 3 illustrates an exemplary embodiment of the present invention's system for reorganizing table space in a database.

FIG. 3 illustrates an exemplary embodiment of the present invention's system for reorganizing table space in a database. The system comprises: (a) an identifier 302 to identify LOB table spaces that are related to the table space being reorganized; (b) a shadow data set creator 304 to concurrently create a shadow data set for each of the LOB table spaces and a shadow data set for the table space and associated indexes; (c) a shadow data set loader 306 for loading rows into shadow data sets, and for each row loaded, reading LOBs from each of the LOB table spaces relating to a loaded row and writing said read LOB to a corresponding shadow data set; and (d) a data switcher 308 for switching the original data set with the shadow data sets.

The present invention includes a computer program code based product, which is a storage medium having program code stored therein, which can be used to instruct a computer to perform any of the methods associated with the present invention. The computer storage medium includes any of, but not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM or any other appropriate static or dynamic memory, or data storage devices.

Implemented in computer program code based products are software modules having: (a) computer readable program code allocating shadow data sets for each of the table spaces and indexes; (b) computer readable program code blocking write access to the data; (c) unload rows from the original table spaces; (d) computer readable program code sorting the rows; (e) computer readable program code loading the rows into the shadow data sets, extracting index keys for each row as it is loaded:

(iii) for each row, computer readable program code identifying which columns represent LOB data; and (iv) for each LOB column, computer readable program code utilizing the rowid of the current row to read the LOB from its associated LOB table space and write the read LOB to the corresponding shadow data set;

(f) computer readable program code sorting the index keys; (g) computer readable program code building the indexes from the sorted index keys; (h) computer readable program code switching the original data sets with the shadow data sets, including LOB shadows; and (i) computer readable program code allowing write operations to proceed.

CONCLUSION

A system and method has been shown in the above embodiments for the effective implementation of a system and method for concurrently reorganizing logically related LOB table spaces. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The above enhancements for reorganizing table spaces in a database and its described functional elements are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of database programming.

The invention claimed is:

1. A method for reorganizing a Large Object (LOB) table space in a database comprising the steps of:
   (a) identifying a LOB base table space to be reorganized and its associated indexes;
   (b) identifying auxiliary LOB table spaces and their associated indexes that are related to said identified LOB base table space being reorganized;
   (c) concurrently allocating a shadow data set for each LOB table space and associated indexes identified in steps (a) and (b);
   (d) loading rows from said identified LOB base table space into a corresponding shadow data set, and for each row loaded, reading LOB data from each of said identified auxiliary LOB table spaces relating to said loaded row and writing said read LOB data to a corresponding shadow data set; and
   (e) switching an original data set of each of said LOB table spaces and associated indexes identified in steps (a) and (b) with corresponding shadow data set from step (d).

2. A method for reorganizing a Large Object (LOB) table space in a database, as per claim 1, wherein said method further comprising the steps of:
   prior to step (a), blocking write access to data being reorganized; and
   subsequent to step (e), allowing write operations related to data being organized to proceed.

3. A method for reorganizing a Large Object (LOB) table space in a database, as per claim 1, wherein said method is implemented across networks.

4. A method for reorganizing a Large Object (LOB) table space in a database, as per claim 3, wherein a network element of said networks is any of the following: local area network (LAN), wide area network (WAN), or the Internet.

5. A method for concurrently reorganizing logically related Large Object (LOB) table spaces in a database comprising the steps of:
   (a) identifying base and logically related LOB table spaces and associated indexes and allocating shadow data sets for each identified LOB table space and associated indexes;
   (b) loading rows into an allocated shadow data set and extracting index keys for each loaded row, and
      (i) for each row, identifying columns representing LOB data; and
      (ii) for each column in said LOB data, using a rowid of current row to read said LOB data from its logically related LOB table space and write said read LOB data to the corresponding allocated shadow data set; and
   (c) switching an original data set of each of said identified LOB table spaces and associated indexes with corresponding shadow data set derived from step (b).

6. A method for concurrently reorganizing logically related Large Object (LOB) table spaces in a database, as per claim 5, wherein said method further comprising the steps of:
   prior to step (a), blocking write access to data being reorganized; and
   subsequent to step (c), allowing write operations related to data being organized to proceed.

7. A method for concurrently reorganizing logically related Large Object (LOB) table spaces in a database, as per claim 5, wherein said method further comprising the steps of:
   prior to step (a), unloading rows from said identified base LOB table space; and
   sorting unloaded rows, whereby said step of loading rows into shadow data set involves loading said sorted rows.

8. A method for concurrently reorganizing logically related Large Object (LOB) table spaces in a database, as per claim 5, wherein said method is implemented across networks.

9. A method for concurrently reorganizing logically related Large Object (LOB) table spaces in a database, as per claim 8, wherein a network element of said networks is any of the following: local area network (LAN), wide area network (WAN), or the Internet.

10. An article of manufacture comprising a computer usable medium having computer readable program code embodied therein which implements a method for concurrently reorganizing logically related Large Object (LOB) table spaces in a database, said medium comprising:
    (a) computer readable program code identifying base and logically related LOB table spaces and associated indexes and allocating shadow data sets for each identified LOB table space and associated indexes;
    (b) computer readable program code loading rows into an allocated shadow data set and extracting index keys for each loaded row, and
       (i) for each row, computer readable program code identifying columns representing LOB data; and
       (ii) for each column in said LOB data, computer readable program code using a rowid of current loaded row to read said LOB data from its logically related LOB table space and write said read LOB data to the corresponding allocated shadow data set; and
    (c) computer readable program code switching an original data set of each of said identified LOB table spaces and associated indexes with corresponding shadow data set processed in step (b).

11. An article of manufacture as per claim 10, wherein said medium further comprises:
    computer readable program code blocking write access to data being reorganized; and
    computer readable program code allowing write operations related to data being organized to proceed.

12. An article of manufacture as per claim 10, wherein said med further comprises:
    computer readable program code unloading rows from said identified base LOB table spaces; and
    computer readable program code sorting said unloaded rows, whereby said computer readable program code for loading rows into allocated shadow data set loads said sorted rows.

13. An article of manufacture as per claim 12, wherein said medium further comprises:
    computer readable program code blocking write access to data being reorganized; and
    computer readable program code allowing write operations related to data being organized to proceed.

14. An article of manufacture comprising a computer usable medium having computer readable program code embodied therein which implements a method for reorganizing a Large Object (LOB) table space in a database, said medium comprising:

(a) computer readable program code identifying a LOB base table space to be reorganized and its associated indexes;

(b) computer readable program code identifying auxiliary LOB table spaces and their associated indexes that are related to said identified LOB base table space being reorganized;

(c) computer readable program code concurrently allocating a shadow data set for each LOB table spaces and associated indexes identified in steps (a) and (b);

(d) computer readable program code loading rows from said identified LOB base table space into a corresponding shadow data set, and for each row loaded, computer readable program code reading LOB data from each of said identified auxiliary LOB table spaces relating to said loaded row and computer readable program code writing said read LOB data to a corresponding shadow data set; and (e) computer readable program code switching an original data set of each of said LOB table spaces and associated indexes identified in (a) and (b) with corresponding shadow data set produced in (d).

15. An article of manufacture as per claim 14, wherein said medium further comprises:

computer readable program code blocking write access to data being reorganized; and computer readable program code allowing write operations related to data being organized to proceeds.

16. A method for concurrently reorganizing logically related Large Object (LOB) table spaces in a database comprising the steps of:

(a) identifying a base LOB table space to be reorganized and its associated indexes;

(b) identifying LOB table spaces and associated indexes logically related to said identified base LOB table space;

(c) allocating shadow data sets for said LOB table spaces and associated indexes;

(d) unloading rows from said identified base LOB table space;

(e) sorting said unloaded rows;

(f) loading sorted rows into said allocated shadow data sets and extracting index keys for each row as it is loaded, and (i) for each loaded row, identifying columns representing LOB data;

(ii) for each identified column representing said LOB data, using a rowid of current loaded row to read the LOB data from its identified logically related LOB table space and write said read LOB data to the corresponding allocated shadow data set;

(g) sorting said extracted index keys;

(h) building indexes from said sorted index keys; and (i) switching an original data set of each of said identified LOB table spaces and associated indexes with corresponding shadow data sets processed in step (f) and (h).

17. A method for concurrently reorganizing logically related Large Object (LOB) table spaces in a database, as per claim 16, wherein said method further comprising the steps of:

prior to step (b), blocking write access to data being reorganized; and subsequent to step (i), allowing write operations related to data being organized to proceed.

18. A computer based system to reorganize a table space in a database comprising:

(a) an identifier to identify Large Object (LOB) table spaces that are related to said table space being reorganized;

(b) a shadow data set creator to concurrently create shadow data sets for said LOB table spaces and associated indexes;

(c) a shadow data set loader to load rows from said table space being reorganized into a corresponding shadow data set, and for each row loaded, reading LOB data from each of said identified LOB table spaces relating to a loaded row and writing said read LOB data to the corresponding shadow data set; and (c) a data switcher to switch an original data set of said LOB table spaces and associated indexes with shadow data set produced in step (c).

19. A computer based system as per claim 18, wherein said system is implemented across networks.

20. A computer based system as per claim 19, wherein a network element of said networks is any of the following: local area network (LAN), wide area network (WAN), or the Internet.

* * * * *